(12) United States Patent
Hale

(10) Patent No.: US 7,063,238 B2
(45) Date of Patent: Jun. 20, 2006

(54) CARTRIDGE EJECTOR FOR A BEVERAGE DISPENSING MACHINE

(76) Inventor: Robert Hale, 40 Ridgetop Road, Scarborough, Ontario (CA) M1R 4G3

( * ) Notice: Subject to any disclaimer, the term of this patent is extended or adjusted under 35 U.S.C. 154(b) by 519 days.

(21) Appl. No.: 10/185,196

(22) Filed: Jun. 28, 2002

(65) Prior Publication Data

US 2003/0071056 A1    Apr. 17, 2003

Related U.S. Application Data

(60) Provisional application No. 60/301,437, filed on Jun. 29, 2001.

(51) Int. Cl.
B65D 88/54    (2006.01)

(52) U.S. Cl. .................. 222/325; 222/81; 222/83.5; 222/129.1; 99/295

(58) Field of Classification Search ............. 222/129.1, 222/83, 129.2, 81, 129.3, 82, 129.4, 85, 146.2, 222/80, 145.5, 86, 145.6, 325, 83.5, 92, 95–96, 222/105–107; 99/295, 300, 302 R, 304, 99/307, 279
See application file for complete search history.

(56) References Cited

U.S. PATENT DOCUMENTS

| 3,292,527 | A | * | 12/1966 | Stasse ......................... 99/295 |
| 3,374,927 | A | * | 3/1968 | Schmidt ....................... 222/82 |
| 3,385,475 | A | * | 5/1968 | Loe ............................ 222/83.5 |
| 3,470,812 | A | * | 10/1969 | Levinson ...................... 99/295 |
| 3,584,767 | A | * | 6/1971 | Dawson et al. ................ 222/85 |
| 3,628,444 | A | * | 12/1971 | Mazza ......................... 99/275 |
| 3,752,362 | A | * | 8/1973 | Risener ........................ 222/85 |
| 3,754,463 | A | * | 8/1973 | Vernooy ....................... 99/295 |
| 3,926,339 | A | * | 12/1975 | Openchowski ............... 222/83 |
| 4,259,573 | A | | 3/1981 | Prober et al. |
| 5,472,719 | A | * | 12/1995 | Favre .......................... 426/77 |
| 5,709,539 | A | | 1/1998 | Hammer et al. |
| 5,723,861 | A | | 3/1998 | Carnahan et al. |
| 5,773,067 | A | * | 6/1998 | Freychet et al. ............ 426/506 |
| 5,801,820 | A | | 9/1998 | Bysouth et al. |
| 5,897,899 | A | * | 4/1999 | Fond .......................... 426/112 |
| 6,606,938 | B1 | * | 8/2003 | Taylor ......................... 99/295 |
| 6,810,788 | B1 | * | 11/2004 | Hale ........................... 99/295 |
| 6,955,116 | B1 | * | 10/2005 | Hale ........................... 99/295 |

FOREIGN PATENT DOCUMENTS

EP    0 528 386 A2    2/1993
EP    0 684 470 A2    11/1995

* cited by examiner

Primary Examiner—Frederick C. Nicolas
(74) Attorney, Agent, or Firm—Dinsmore & Shohl LLP

(57) ABSTRACT

A cartridge ejector mechanism for a beverage dispensing machine comprises a cartridge holder sized to receive a beverage cartridge. The cartridge holder is coupled to the beverage dispensing machine and the cartridge holder is movable between a cartridge loading position and a beverage dispensing position. A cartridge ejector is coupled to the beverage dispensing machine. The cartridge ejector is responsive to movement of the cartridge holder from the beverage dispensing position to the cartridge loading position. Interaction between the cartridge ejector and the beverage cartridge when the cartridge holder is being moved from the beverage dispensing position towards the cartridge loading position causes the beverage cartridge to be removed from the cartridge holder.

20 Claims, 5 Drawing Sheets

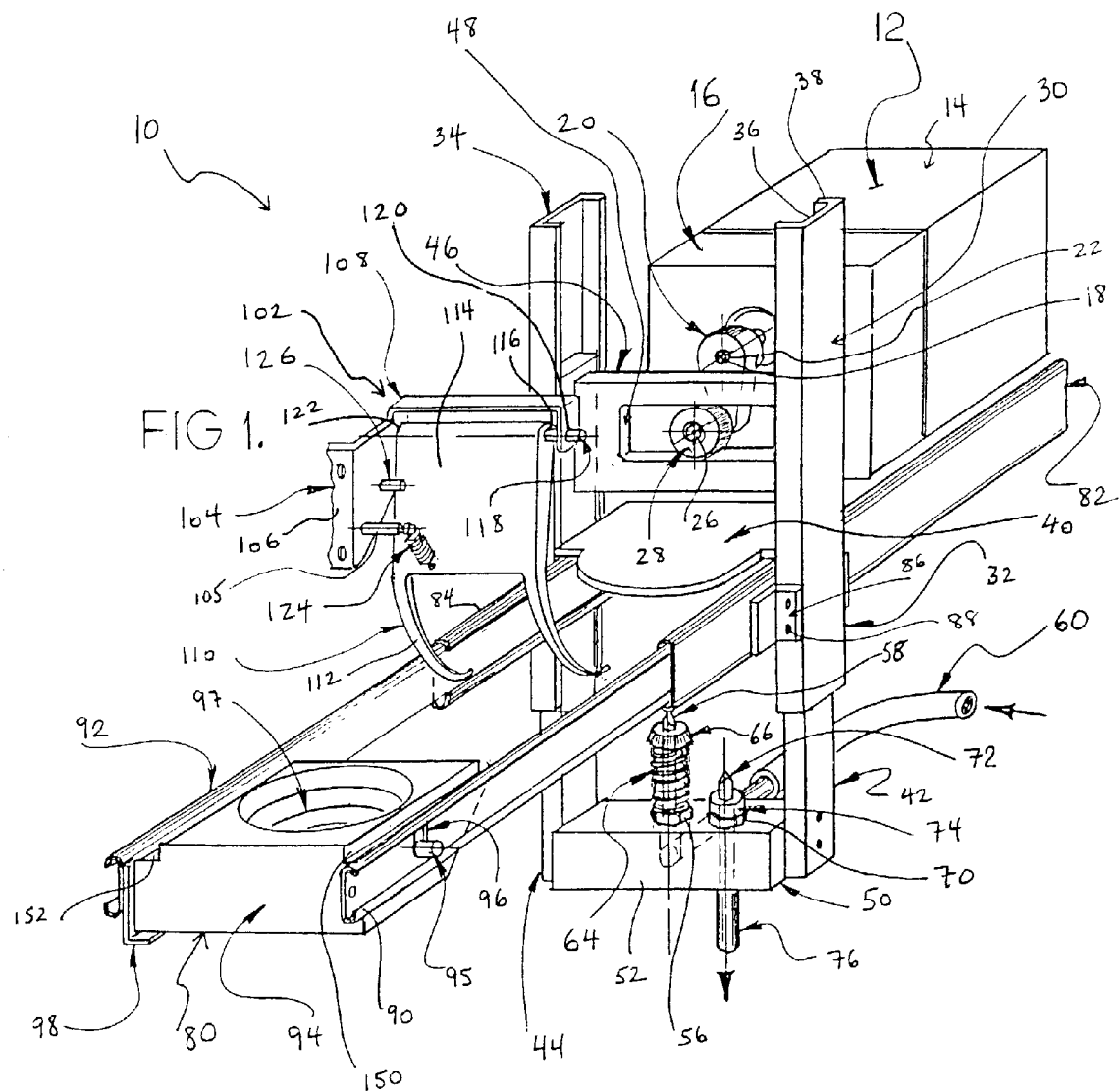

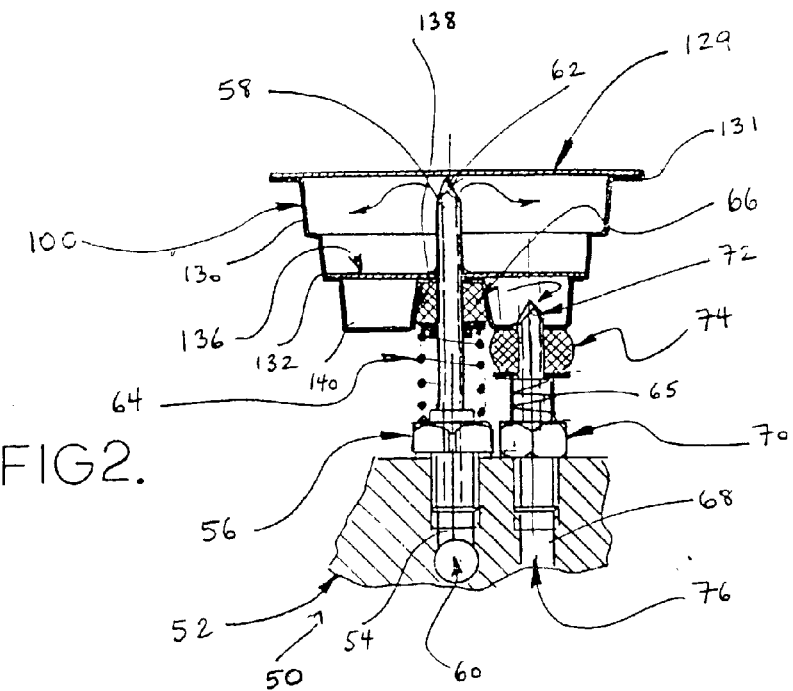
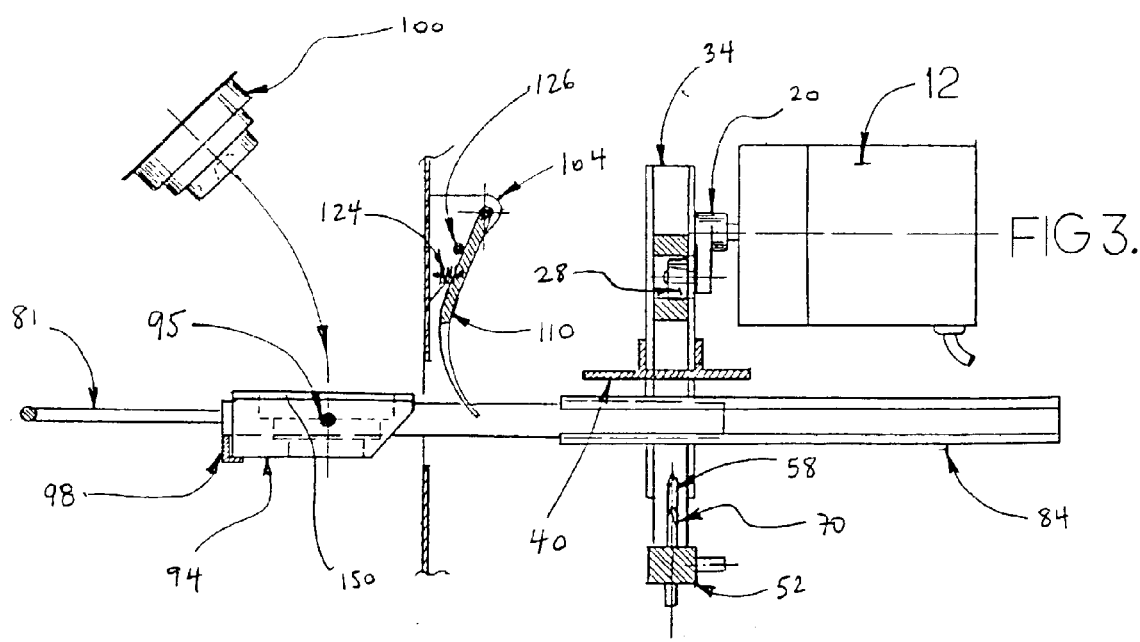

CARTRIDGE EJECTOR FOR A BEVERAGE DISPENSING MACHINE

CROSS-REFERENCES TO RELATED APPLICATIONS

This application claims priority to U.S. Provisional Application No. 60/301,437, filed Jun. 29, 2001, the entire disclosure of which is incorporated herein by reference.

FIELD OF THE INVENTION

The present invention relates to beverage dispensing machines, and in particular to a cartridge ejector mechanism for a beverage dispensing machine.

BACKGROUND OF THE INVENTION

Single serving beverage dispensing machines are very popular because they provide a fresh tasting beverage quickly without having to produce multiple servings. Single serving beverages such as coffee are typically produced by beverage dispensing machines that use beverage cartridges holding beverage products.

When operating a beverage dispensing machine of this nature, a user typically loads a new cartridge into a cartridge holder located in a glide mechanism and slides the mechanism into place. Once in place, the beverage making process can begin. Generally, a liquid under pressure is injected into the cartridge through the beverage product and the beverage is extracted from the bottom of the cartridge.

Following production of the beverage, the used cartridge must be ejected. Existing methods of cartridge ejection can be unreliable. Some methods rely on gravity to dislodge the cartridge by flipping over the cartridge holder. The cartridge may not fall out of the cartridge holder easily if the cartridge and cartridge holder are not completely clean and free of debris. Therefore, it is desirable to produce a reliable cartridge ejector mechanism.

Additionally, typical beverage dispensing machines of this nature do not have a means to stop a user from retracting the glide mechanism during the operation of the machine. In the case that a user accidentally pulls the cartridge out of position, the process will be forced to stop mid-cycle. Therefore, the partially used cartridge and any beverage that has already been produced will be wasted. It is also possible that the equipment may become jammed.

It is therefore an object of the present invention to provide a novel cartridge ejector mechanism for a beverage dispensing machine that obviates or mitigates at least one of the above disadvantages.

SUMMARY OF THE INVENTION

According to one aspect of the present invention there is provided a cartridge ejector mechanism for a beverage dispensing machine, the cartridge ejector mechanism comprising:

a cartridge holder sized to receive a beverage cartridge, the cartridge holder being coupled to the beverage dispensing machine, the cartridge holder being movable between a cartridge loading position and a beverage dispensing position;

a cartridge ejector coupled to the beverage dispensing machine, the cartridge ejector being responsive to movement of the cartridge holder between the beverage dispensing position and the cartridge loading position;

wherein interaction between the cartridge ejector and the beverage cartridge when the cartridge holder is being moved from the beverage dispensing position towards the cartridge loading position causes the beverage cartridge to be removed from the cartridge holder.

According to another aspect of the present invention there is provided a beverage extraction mechanism for a beverage dispensing machine, the beverage extraction mechanism comprising:

a cartridge holder sized to receive a beverage cartridge, the cartridge holder being coupled to the beverage dispensing machine;

a base coupled to the beverage dispensing machine, the base being movable relative to the cartridge holder into a beverage dispensing position;

an injector coupled to the base, the injector for piercing the beverage cartridge when the base is in the beverage dispensing position to deliver hot water to the beverage cartridge from a water source;

an extractor coupled to the base, the extractor for piercing the beverage cartridge when the base is in the beverage dispensing position to retrieve prepared beverage from the beverage cartridge; and a drive assembly mechanically coupled to one of the base and the cartridge holder to move the extractor relative to the cartridge holder.

The present invention provides advantages in that the user is not required to handle the used beverage cartridge, and the used cartridge automatically is disposed of in one step as a result of the user moving the cartridge holder to the cartridge loading position. In addition, the cartridge removal process is more reliable and efficient than prior art devices because the process is mechanical, therefore requiring no electrical components.

BRIEF DESCRIPTION OF THE DRAWINGS

An embodiment of the present invention will now be described more fully with reference to the accompanying drawings in which:

FIG. 1 is an isometric view of a beverage dispensing machine having a cartridge ejector mechanism in accordance with the present invention;

FIG. 2 is a front elevational view of a portion of FIG. 1 partly in section;

FIG. 3 is a side elevational view partly in section of the beverage dispensing machine of FIG. 1 in a pre-loading position;

DETAILED DESCRIPTION OF THE PREFERRED EMBODIMENT

Figure 4:
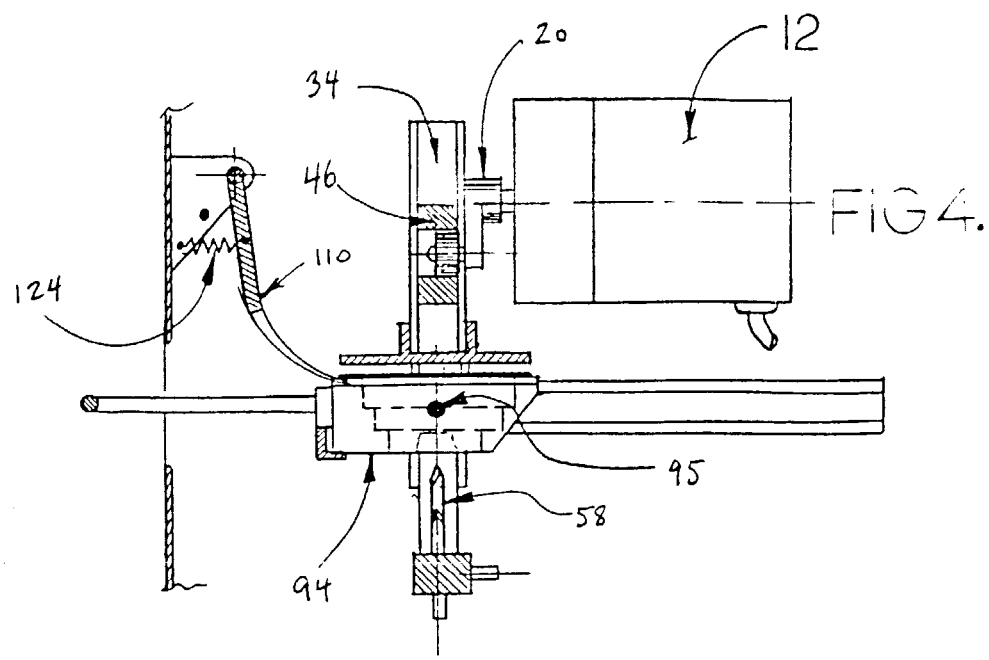
FIG. 4 is a side elevational view partly in section of the beverage dispensing machine of FIG. 3 in a loaded position.

Referring now to FIG. 1, a beverage dispensing machine is generally indicated at 10. The beverage dispensing machine 10 generally comprises a driving assembly 12 that is mounted in a housing (not shown). A glide assembly 80 is slidable, by a user, into and out of the housing and moves a beverage cartridge 100 from a pre-loading position shown in FIG. 3 to a loaded position shown in FIG. 4. The driving assembly 12 is mechanically coupled to a beverage extraction assembly 30 that is movable into and out of a beverage dispensing position, shown in FIG. 5. In the beverage dispensing position, the extraction assembly 30 interacts with the cartridge 100 to produce a beverage. A cartridge ejector mechanism 102 is also provided to remove the used beverage cartridge 100 from the glide assembly 80.

The beverage extraction assembly 30 comprises a pair of vertical guides 32 and 34 that are coupled to opposite inner walls (not shown) of the housing. The guides 32, 34 are C-shaped channels having web portions 36 with flanges 38 extending therefrom. The guides 32, 34 are secured to the inner walls of the housing with the web portion 36 of each guide 32, 34 abutting an inner wall. A compression plate 40 extends between the flanges 38 of the guides 32, 34 approximately midway along the guides 32, 34. The plate 40 is positioned so as not to obstruct the channel portion of the guides 32, 34. The plate 40 may be secured to the guides 32, 34 by welding or other suitable attachment means.

The beverage extraction assembly 30 further comprises sliding members 42 and 44 that slide vertically within the channels provided by guides 32 and 34. A plate 46 extends between the upper ends of sliding members 42 and 44 and is fastened thereto by any suitable means. The plate 46 has a horizontally extending slot 48 therein that interacts with the driving assembly 12. A cartridge piercing assembly 50 extends between the lower ends of sliding members 42 and 44. The cartridge piercing assembly 50 is better illustrated in FIG. 2.

Referring to FIG. 2, cartridge piercing assembly 50 includes a base 52 that extends between the lower ends of sliding members 42 and 44. An inlet bore 54 is provided through the base 52 and extends between a water inlet tube 60, shown in FIG. 1, and a water inlet support 56. The water inlet support 56 is partially embedded in the inlet bore 54. An injector 58 extends upwardly from the water inlet support 56. The tip of injector 58 is provided with outlets 62 from which water is expelled. A spring 64 surrounds the injector 58 and extends between the water inlet support 56 and a water inlet seal 66 on the injector 58 at a location slightly below its tip. The spring 64 is biased so that the seal 66 is forced into engagement with a beverage cartridge 100.

An outlet bore 68 is located adjacent the inlet bore 54 in base 52 and extends through the thickness of the base 52. A beverage outlet tube 76 is coupled to the lower end of the outlet bore 68. A beverage outlet support 70 is partially embedded in the top of the outlet bore 68 and an outlet extractor 72 extends upwardly therefrom. A gasket 74 surrounds the extractor 72. The gasket 74 is compressed by a spring 65 that is located between the gasket 74 and the beverage outlet support 70. The spring 65 is shaped at its upper end to provide an annular surface on which the gasket 74 rests. The compressed gasket 74 causes a seal to be provided between the extractor 72 and the beverage cartridge 100.

The beverage extraction assembly 30 is vertically driven by driving assembly 12. The driving assembly 12 includes a motor 14 that is supported at the rear of the housing. The motor 14 in the preferred embodiment is a fractional horse power motor, however, any suitable driving motor may be used. The drive shaft (not shown) of the motor 12 drives a reduction gear 16. A rotor 18 extends from the reduction gear 16 and is drivingly connected to a cam 20 through a first aperture 22. The cam 20 has a second aperture (not shown) that is offset from the driving axis of the rotor 18. A pin 26 having a roller bearing 28 mounted thereon extends from the second aperture 24.

Roller bearing 28 extends through slot 48 in the plate 46 so that driving assembly 12 is in driving engagement with beverage extraction assembly 30.

Figure 5:
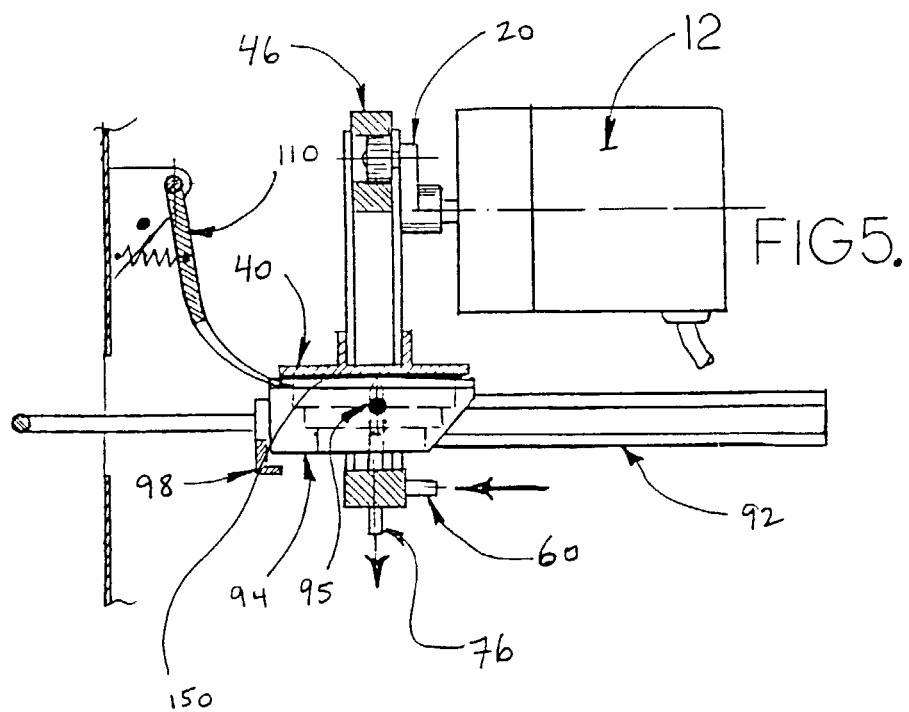
FIG. 5 is a side elevational view partly in section of the beverage dispensing machine of FIG. 3 in a dispensing position.

As mentioned previously, the glide assembly 80 is mounted in the housing and is slidable between the pre-loading position of FIG. 3 and the loaded position of FIG. 4. The glide assembly 80 comprises a pair of horizontal tracks 82 and 84. The tracks 82, 84 are coupled to the guides 32 and 24 by angles 86 and fasteners 88. The horizontal tracks 82, 84 extend rearwardly and forwardly of the beverage extraction assembly 30. A handle 81 extends outwardly from the front of the housing and is connected to the glide assembly 80. Pulling or pushing the handle 81 moves the glide assembly 80 into or out of the housing.

Rails 90 and 92 are received by the tracks 82, 84 and slide therein. A cartridge holder 94 is located at the forward end of the rails 90 and 92 and extends therebetween. The cartridge holder 94 has a bore 97 therethrough that is shaped to accommodate the beverage cartridge 100. The cartridge holder 94 additionally has a pair of grooves 150 and 152 that are located adjacent rails 90 and 92 respectively.

The cartridge holder 94 is pivotable about a pin 95 that extends laterally from one side thereof. The pin 95 extends through a slot 96 that is located in rails 90. A stop 98 is attached to rail 92 at a lower forward corner thereof. The stop 98 ensures that the cartridge holder 94 can only pivot in a clockwise direction about pin 95. This ensures that the top of the cartridge holder 94 tilts toward the interior of the housing.

The type of beverage cartridge 100 typically used has a stepped conical shape that decreases in size toward the lower end of the cartridge 100. Referring to FIG. 2, the cartridge 100 has an upper lip 131, an upper step 130 and a lower step 132. A cover 129 is connected to the upper lip 131 and hermetically seals the cartridge 100 for storage purposes. A filter 136 is located at the lower step 132 and a powdered beverage is contained within the cartridge 100 between the filter 136 and the cover 129. A recess 138 is formed in the bottom layer 140 of the cartridge 100 so that there is no space between the lower filter 136 and the cartridge 100 at the location of the recess 138.

The lateral edges of the upper lip 131 of the cartridge 100 are sized to extend over the grooves 150, 152 of the cartridge holder 94 so that there is a space provided between the upper lip 131 and the cartridge holder 94 at the location of the grooves 150, 152. The rear edge of the upper lip 131 is sized to align with the rear edge of the cartridge holder 94. The forward edge of the upper lip 131 is sized so that it is inset a small distance from the forward edge of the cartridge holder 94.

The cartridge ejection mechanism 102 is mounted to a front end of the housing and interacts with the cartridge holder 94. A support bracket 104 has a flange 106 that is coupled to the inner front wall of the housing by fasteners (not shown). The bracket 104 includes a horizontally extending arm 108. A fork 110 has two prongs 112 that extend from an upper portion 114. The prongs 112 of the fork 110 extend downward and curve toward the rear of the housing. The upper portion 114 of the fork 110 has a bore 116 that extends therethrough. A rod 118 extends through the bore 116 and through apertures 120, 122 provided in the horizontally extending arm 108 of the bracket 104. This allows for the fork 110 to pivot while it is supported by the rod 118.

A spring 124 is connected to a post 105 at a first end and the upper portion of fork 110 at a second end. The spring 124 biases the fork 110 toward the inner front wall of the housing. A fork stop 126 extends from the bracket 104 to maintain the upper portion 114 of the fork 110 a predetermined distance from the front wall.

Operation of the beverage dispensing machine will now described using coffee as an example beverage. Referring now to FIG. 3, the glide assembly 80 starts in the pre-loading position. A user deposits a beverage cartridge 100 in the cartridge holder 94 and pushes the glide assembly 80 into the loaded position as shown in FIG. 4. As the glide assembly 80 moves towards the loaded position, the fork 110 pivots about rod 118 and is displaced upwardly due to the motion of the cartridge holder 94. The prongs 112 of the fork 110 rest in grooves 150 and 152 at the forward end of the cartridge holder 94, below the upper lip 131 of the beverage cartridge 100.

Once the glide assembly 80 is in the closed position, the beverage preparation cycle may begin. The user typically presses a button to start the cycle however this may be accomplished in any suitable manner.

In the loaded position of FIG. 4, the cam 20 is oriented with the second aperture 24 below the first aperture 22. Motor 14 drives rotor 18, which causes the cam 20 to rotate. Rotation of the cam 20 causes the roller bearing 28 to move upwardly which in turn drives the plate 46 and the cartridge piercing assembly 50 upwardly into the dispensing position of FIG. 5.

In the dispensing position, the beverage cartridge 100 abuts the plate 40 and the cartridge 100 is placed under a pressure of up to 8 bar. The injector 58 pierces the cartridge 100 and the filter 136 at the location of the recess 138. With the cartridge and filter pierced, a pump (not shown) forces a predetermined amount of hot water into the cartridge 100. Once the water is inside the cartridge 100, it is deflected downward by the cover 129 and mixes with the powdered coffee held in the cartridge. Brewed coffee then flows downward through the lower filter 136 and collects in the bottom layer 140 of the cartridge 100. From the bottom layer 140, the coffee is removed through the extractor 72 and flows out of beverage outlet tube 76 into a container such as a coffee mug. To ensure that the coffee flows out of the cartridge 100 efficiently, air is forced through the injector 58 in order to purge the cartridge 100 of liquid.

Figure 6:
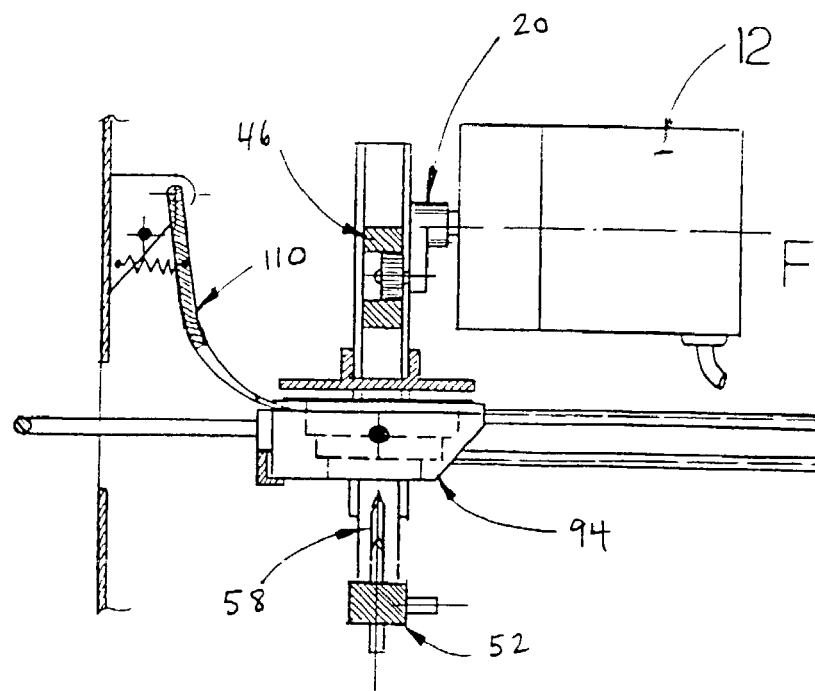
FIG. 6 is a side elevational view partly in section of the beverage dispensing machine of FIG. 3 in a post-dispensing position.

Following preparation of the beverage, the motor 14 resumes driving the rotor 18. The cam 20 rotates from the dispensing position of FIG. 5 in which the second aperture 24 is located above the first aperture 22 to the post-dispensing position of FIG. 6 in which the second aperture 24 is located below the first aperture 22. The cycle is now complete. In order to brew a second beverage, the user must pull the glide assembly 80 outwardly in order to load an unused cartridge 100 into the cartridge holder 94.

Figure 7:
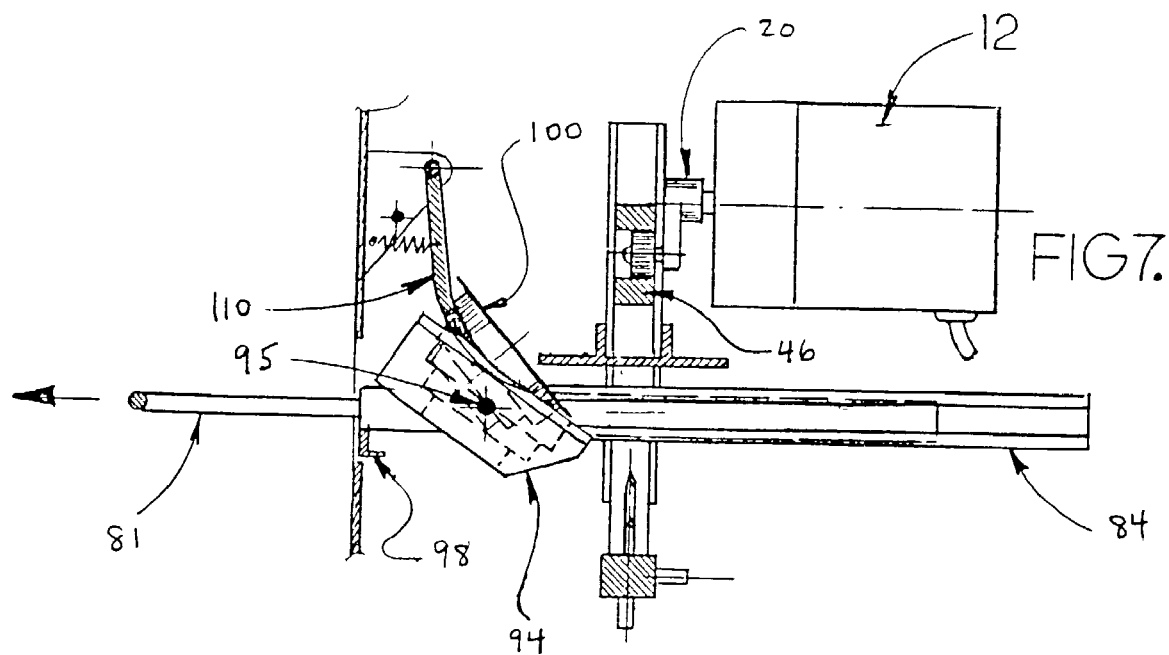
FIG. 7 is a side elevational view partly in section of the beverage dispensing machine of FIG. 3 in a cartridge ejection position.
Figure 8:
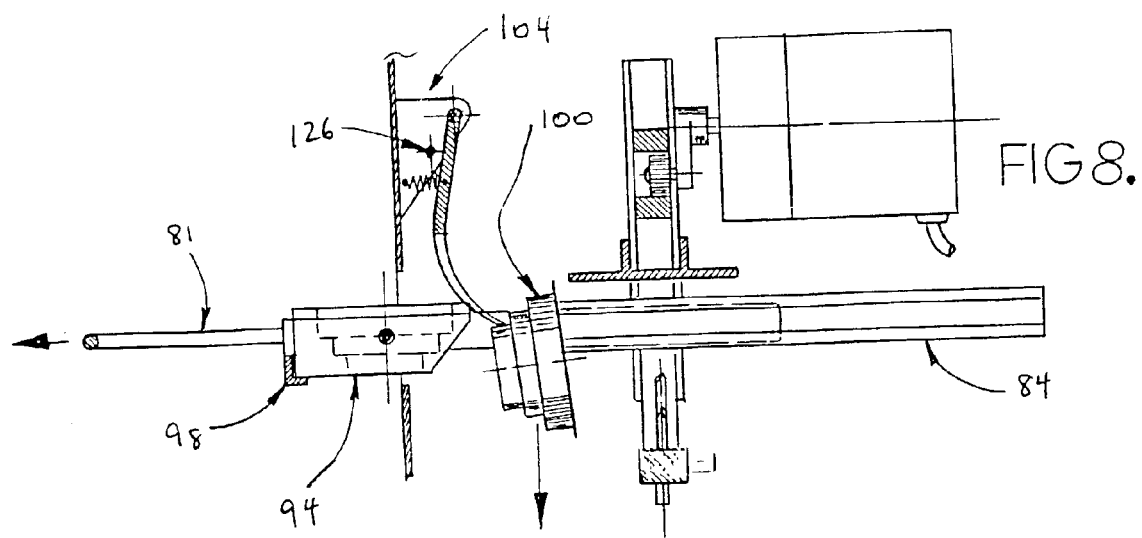
FIG. 8 is a side elevational view partly in section of the beverage dispensing machine of FIG. 3 just prior to returning to the pre-loading position shown in FIG. 3.

Referring to FIGS. 7 and 8, the glide assembly is shown moving outwardly. The fork 110 is restricted from moving downward until the cartridge holder 94 has traveled outward a predetermined distance. As the cartridge holder 94 travels outward, the prongs 112 are forced further underneath the upper lip 131 of the cartridge 100, which causes the cartridge 100 to be partially lifted out of the cartridge holder 94.

Once the cartridge holder 94 has moved outwardly beyond the predetermined distance, the fork 110 and the partially dislodged cartridge 100 force the cartridge holder 94 to pivot inwardly about pin 95. As the cartridge holder 94 is displaced, the prongs 112 move downwardly and outwardly towards their original position. The movement of the prongs 112 further lifts the upper lip 131 and frees the beverage cartridge 100 from engagement with the cartridge holder 94. Once removed from the cartridge holder 94, the beverage cartridge 100 is dropped into the lower part of the housing where used cartridges 100 are collected.

The forced engagement between the beverage cartridge 100 and plate 40 is such that a large amount of friction is produced between the two components. This creates a lock between the glide assembly 80 and the beverage extracting assembly 30 so that a user can not interrupt the brew cycle by pulling the glide assembly 80 outwardly. Alternate locking means may be used to restrict a user from interrupting the brew cycle.

Such locking means includes a limit switch that is located on at least one of the tracks 82, 84. The limit switch is located so that the rear edge of the upper lip 131 of the beverage cartridge 100 must engage the switch in order for the beverage dispensing machine 10 to operate. If the glide assembly 80 is pushed into the loaded position with no beverage cartridge 100 in the cartridge holder 94 then the machine 10 will not operate. Alternatively, if the beverage cartridge 100 moves out of engagement at any point during the cycle operation of the machine 10 will halt.

Although operation of the beverage dispensing machine 10 has been described in relation to coffee, it will be appreciated by those of skill in the art that any type of beverage could be produced.

If desired, a needle may be provided on the cartridge piercing assembly that extends from the top of the outlet extractor 72. The needle extends higher than the injector 58. This embodiment is useful when there is a positive pressure in the cartridges 100 that can occur at increased elevations. When the cartridge piercing assembly 50 is raised into the dispensing position of FIG. 5, the needle pierces the cartridge 100 first. This allows the cartridge 100 to be vented prior to the injector engaging the cartridge 100 so that the injector 58 does not become contaminated by the powdered beverage.

If desired, the plate 40 is pivotally attached to at least one guide 32, 34 in the location shown in FIGS. 1 and 3 to 8. This enables the plate 40 to pivot with the cartridge holder 94 so that the cartridge ejection process can begin as soon as withdrawal of the glide assembly 80 has begun.

If desired, the hot water enters the cartridge 100 from the top. In this embodiment, the water inlet support 56, the inlet seal 66 and the injector 58 would be located above the cartridge 100. The beverage dispenser would operate in a similar manner to that which has been described.

Although a preferred embodiment of the present invention has been described, those of skill in the art will appreciate that variations and modifications may be made without departing from the spirit and scope thereof as defined by the appended claims.

I claim:

1. A cartridge ejector mechanism for a beverage dispensing machine, the cartridge ejector mechanism comprising:
   a pivotable cartridge holder sized to receive a beverage cartridge, said cartridge holder being coupled to said beverage dispensing machine, said cartridge holder being movable between a cartridge loading position and a beverage dispensing position; and a cartridge ejector coupled to said beverage dispensing machine, said cartridge ejector being responsive to movement of said cartridge holder between said beverage dispensing position and said cartridge loading position;

wherein interaction between said cartridge ejector and said beverage cartridge when said cartridge holder is being moved from said beverage dispensing position towards said cartridge loading position causes said cartridge holder to pivot to allow said beverage cartridge to be removed from said cartridge holder.

2. A cartridge ejector mechanism as claimed in claim 1, wherein said cartridge ejector is resiliently coupled to a forward inner wall of said beverage dispensing machine.

3. A cartridge ejector mechanism as claimed in claim 2, wherein said cartridge holder is slidable past said forward inner wall of said beverage dispensing machine when said cartridge holder is moved between said beverage dispensing position and said cartridge loading position.

4. A cartridge ejector mechanism as claimed in claim 3, wherein said cartridge ejector is generally fork shaped having at least one prong, said at least one prong extending generally downwardly and away from said forward inner wall of said beverage dispensing machine.

5. A cartridge ejector mechanism as claimed in claim 4, wherein said cartridge holder includes at least one groove located adjacent a cartridge receiving aperture, said at least one groove for receiving said at least one prong of said cartridge ejector, said at least one prong for lifting an upper lip of the beverage cartridge located above said at least one groove.

6. A beverage extraction mechanism for a beverage dispensing machine, the beverage extraction mechanism comprising:

a cartridge holder sized to receive a beverage cartridge, said cartridge holder being coupled to said beverage dispensing machine;

a base coupled to said beverage dispensing machine, said base being movable relative to said cartridge holder into a beverage dispensing position;

an injector coupled to said base, said injector for piercing said beverage cartridge when said base is in said beverage dispensing position to deliver hot water to said beverage cartridge from a water source;

an extractor coupled to said base, said extractor for piercing said beverage cartridge when said base is in said beverage dispensing position to retrieve prepared beverage from said beverage cartridge; and a drive assembly mechanically coupled to one of said base and said cat tridge holder to move said extractor relative to said cartridge holder, wherein said base is vertically movable to bring said injector and said extractor into and out of engagement with said beverage cartridge.

7. A beverage extraction mechanism as claimed in claim 6, wherein said base is located below said cartridge holder.

8. A beverage extraction mechanism as claimed in claim 7, wherein said injector communicates with a powdered beverage stored in said beverage cartridge above a filter and said extractor communicates with said beverage cartridge below said filter.

9. A cartridge ejector mechanism for a beverage dispensing machine, the cartridge ejector mechanism comprising:

a cartridge holder sized to receive a beverage cartridge, said cartridge holder being coupled to said beverage dispensing machine and being moveable along a generally horizontal path between a cartridge loading position and a beverage dispensing position; and a cartridge ejector coupled to said beverage dispensing machine, said cartridge ejector forming a ramp to lift said beverage cartridge from said cartridge holder as said cartridge holder moves along said path from said beverage dispensing position to said cartridge loading position thereby to remove said beverage cartridge from said cartridge holder.

10. A cartridge ejector mechanism as claimed in claim 9, wherein said cartridge ejector is resiliently coupled to said beverage dispensing machine.

11. A cartridge ejector mechanism as claimed in claim 10, wherein said cartridge ejector is generally fork shaped having at least one curved prong, said at least one prong being shaped to define said ramp.

12. A cartridge ejector mechanism as claimed in claim 11, wherein said cartridge holder includes at least one groove located adjacent a cartridge receiving aperture therein, said at least one groove for receiving said at least one prong, said at least one prong engaging an upper lip of said beverage cartridge when said cartridge holder moves along said path from said beverage dispensing position to said cartridge loading position.

13. A cartridge ejector mechanism as claimed in claim 11, wherein said cartridge ejector has a pair of spaced curved prongs.

14. A cartridge ejector mechanism as claimed in claim 12, wherein said cartridge holder and said cartridge ejector pivot when said at least one curved prong engages said beverage cartridge.

15. A cartridge ejector mechanism as claimed in claim 14, wherein said cartridge ejector has a pair of spaced curved prongs.

16. A cartridge ejector mechanism as claimed in claim 9 wherein said cartridge holder is coupled to a glide assembly, said glide assembly including a pair of rails slidable horizontally along a pair of tracks.

17. A cartridge ejector mechanism as claimed in claim 16 wherein said cartridge holder is pivotally mounted on said rails, said cartridge holder pivoting when said cartridge ejector lifts the beverage cartridge from said cartridge holder.

18. A cartridge ejector mechanism as claimed in claim 17, wherein said cartridge ejector is generally fork shaped having at least one curved prong, said at least one prong being shaped to define said ramp.

19. A cartridge ejector mechanism as claimed in claim 18, wherein said cartridge ejector has a pair of spaced curved prongs.

20. A cartridge ejector mechanism as claimed in claim 19, wherein said cartridge holder includes grooves located adjacent a cartridge receiving aperture therein, said grooves for receiving said prongs, said prongs engaging an upper lip of said beverage cartridge when said cartridge holder moves along said path from said beverage dispensing position to said cartridge loading position.

* * * * *